Figure 1:
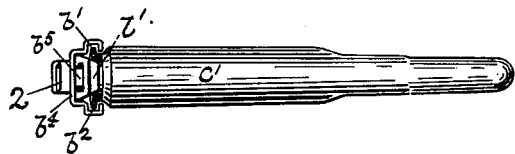

(No Model.)  3 Sheets—Sheet 1.

W. H. HONISS.
CARTRIDGE PACKET.

No. 606,058.  Patented June 21, 1898.

Witnesses:
William A. Lorenz
Jennie Nellis

Inventor:
W. H. Honiss (No Model.)
3 Sheets—Sheet 2.
W. H. HONISS.
CARTRIDGE PACKET.
No. 606,058.                    Patented June 21, 1898.
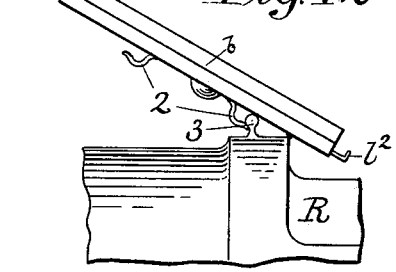
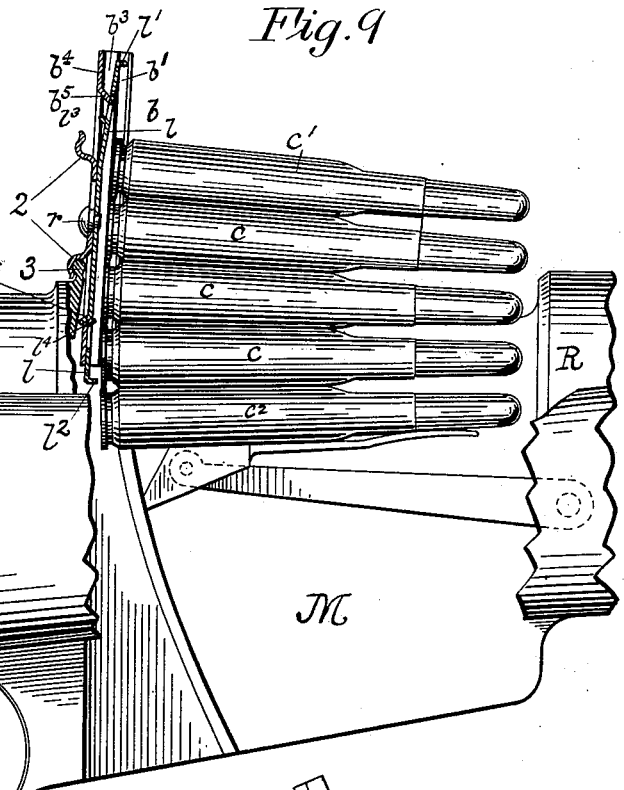
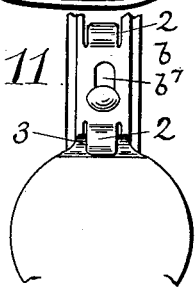
Witnesses:
William A. Lorenz
Jennie Nellis.
Inventor:
W. H. Honiss (No Model.) 3 Sheets—Sheet 3.

W. H. HONISS.
CARTRIDGE PACKET.

No. 606,058. Patented June 21, 1898.

Witnesses:
William A. Lorenz
Jennie Nellis.

Inventor:
W. H. Honiss.

UNITED STATES PATENT OFFICE.

WILLIAM H. HONISS, OF HARTFORD, CONNECTICUT.

CARTRIDGE-PACKET.

SPECIFICATION forming part of Letters Patent No. 606,058, dated June 21, 1898.

Application filed February 23, 1897. Serial No. 624,537. (No model.)

*To all whom it may concern:*

Be it known that I, WILLIAM H. HONISS, a citizen of the United States, residing at Hartford, in the county of Hartford and State of Connecticut, have invented certain new and useful Improvements in Cartridge-Packets, of which the following is a full, clear, and exact specification.

This invention relates to new and improved means for packing and transporting cartridges in an economical and convenient form for use in connection with breech-loading magazine-firearms.

The objects of my invention are, first, to provide a simple and inexpensive device whereby the number of cartridges required for filling the magazine may be held together in the form of a unitary packet, this device being light and compact, so as to add as little as possible to the weight and bulk of the cartridges attached thereto, and of simple and inexpensive construction, so that its small cost will permit of throwing it away after using it once; second, to provide means whereby these devices when used as fillers for the magazine may be quickly attached to the firearm with either end uppermost, so as to avoid confusion or hesitation, in suitable relation to the magazine thereof, so that the cartridges contained in the filler may readily and quickly be transferred to that magazine and so that the emptied filler may be automatically detached and ejected from its seat upon the receiver with ease and certainty by the succeeding normal operation of that firearm; third, to provide means whereby the cartridges may be securely locked in the filler during transportation and until it is attached in position upon the firearm, so arranging the locking devices as to permit the filler itself to be readily charged with the cartridges and so arranged that when in position upon the firearm the pressure applied in pushing the cartridges out of the filler into the magazine will serve to automatically unlock the filler at that end only which is adjacent to the magazine and toward and out of which the cartridges are thus pushed by the hand of the operator.

This invention is herein shown as being adapted for use in connection with a firearm of the class shown and described in the contemporaneously-pending application of E. G. Parkhurst, Serial No. 588,365, filed April 20, 1896, that firearm being provided with a lug 3, located adjacent to the opening of the receiver R, through which the cartridges are pushed into the magazine M. That lug is adapted to receive my improved fillers, as shown in outline in connection with some of the drawings of that application.

Figure 3:
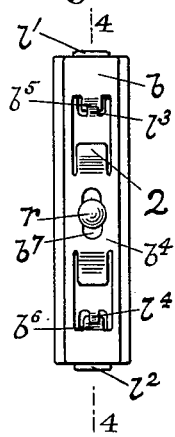
Figure 2:
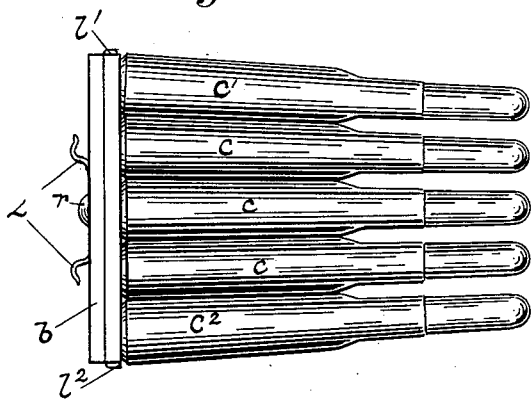
Figure 4:
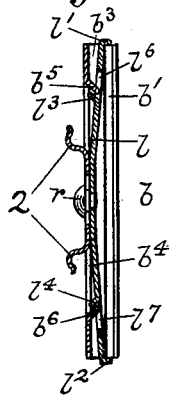
Figure 5:
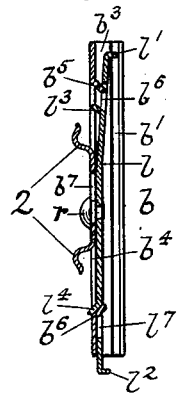
Figure 6:
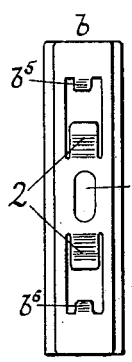
Figures 7, 8:
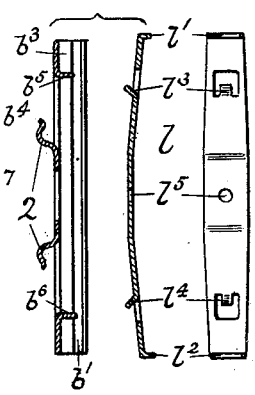
Figure 13:
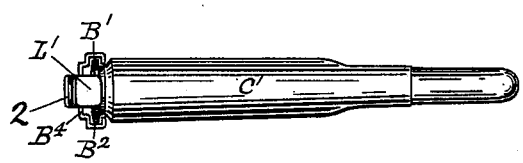
Figure 15:
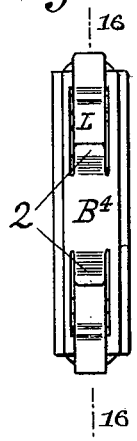
Figure 14:
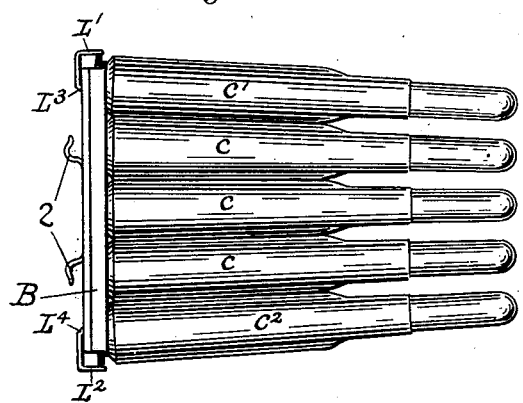
Figure 16:
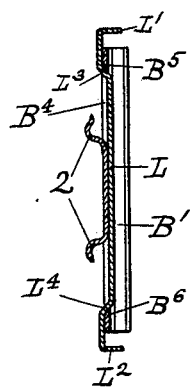
Figure 17:
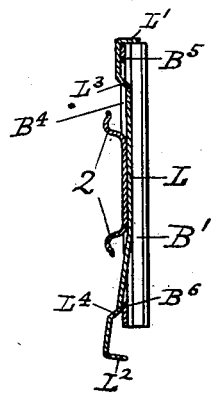

Figures 1 and 2 of the drawings are a plan and a side view, respectively, of a packet of five cartridges in connection with one of my improved fillers, by means of which they are held together. Fig. 3 is a rear view of my improved filler projected from Fig. 2. Fig. 4 is a side view in section, taken on the line 4 4 of Fig. 3, showing my improved filler with the locker in the normal central position occupied by it when engaging the terminal cartridges of the packet shown in Fig. 2. Fig. 5 is a similar view to that of Fig. 4, with the exception that the locker is herein shown to be pushed downwardly, with its lower end retracted out of engaging relation to the lower terminal cartridge, this position of the locker corresponding with that shown in Fig. 9. Fig. 6 is a rear view of the body portion of my improved filler. Fig. 7 is a side view showing the body portion of my improved filler in section and showing in connection therewith an edge view, also in section, of the locker thereof in position ready for assembling. Fig. 8 is a front view of my improved locker projected from the view of Fig. 7. Fig. 9, Sheet 2, is a sectional side view of a portion of a magazine bolt-gun such as that shown in the Parkhurst application, Serial No. 588,365, above referred to, showing in connection therewith one of my improved fillers attached to the receiver, with its locker pushed downwardly, so as to throw its lower end out of locking relation to the lower member of the file of cartridges, which are therein represented as being pushed out of the filler into the magazine of the firearm. In this view a sufficient portion of the side of the receiver is broken away so as to show the interior of the magazine-space, the filler being also shown in section and in position corresponding to that of Fig. 5. Fig. 10 is a side view, and Fig. 11 a rear view, of my emptied filler in connection with a fragment of that portion of the firearm to which it is attached, illustrating the manner in which the forward movement of the bolt serves to swing the lower end of the filler forward out of the receiver before detaching it from the firearm. Fig. 12 represents the emptied filler fully detached from its retaining-lug and being ejected from the firearm. Figs. 13 and 14, Sheet 3, are a plan view and a side view, respectively, of a file of cartridges in connection with a modified form of my improved filler. Fig. 15 is a rear view of the filler projected from Fig. 14. Fig. 16 is a side view in section, taken on the line 16 16 of Fig. 15, representing the filler with the locker in its central or normally-locked position. Fig. 17 is a sectional view similar to that of Fig. 16, differing therefrom only in the respect that the locker is shown to be pushed to its lowest position with relation to the body of the filler, thereby retracting its lower end, so as to release the cartridges.

The preferred form of my improved filler (shown in Figs. 1 to 12, inclusive) consists, essentially, of two parts—the body $b$ and the locker $l$. Both of these parts may be and preferably are made from sheet metal by well-known and inexpensive processes of punching and bending by means of suitable dies. The longitudinal edges of the body $b$ are flanged, so as to form the opposite cartridge-receiving channels $b'$ and $b^2$ for engaging with and guiding the heads or flanges of the superimposed file of cartridges $c$. From these channels the central zone of the filler-body is carried back, so as to form a longitudinal space $b^3$ for the locker $l$ between the plane of the rearward ends of the cartridges and the inner wall of the back plate $b^4$ of the body. The metal which forms the back plate is slit, as shown in Figs. 3 and 6, forming tongues, which are bent backwardly from the plane of the back plate to form the clasps 2, which face in opposite directions toward their respective ends of the clip-body. These tongues of metal after being bent outwardly from the rear wall of the filler are preferably curved inwardly toward that wall, so that the openings of the clasps are somewhat narrower than those portions thereof which engage the head of the lug 3, thereby adapting each clasp to partially encircle the enlarged head of the lug 3 and to form a hinge connection therewith, as shown in Fig. 9. The clip or clasp must be loose enough or be sufficiently elastic to enable it to pass over the head of the lug 3 when placing the filler in position upon the firearm, as shown in the latter figure, in which position it serves to hold the filler against accidental displacement during the operation of charging the magazine, sustaining the weight of the overhanging cartridges and the pressure applied thereto against their tendency to pull the filler forward into the breech-opening.

The filler-body is also provided with the locker-actuators $b^5$ $b^6$, which are also, preferably, integral with the rearward wall or back plate $b^4$ of the filler-body. These actuators consist of tongues which are formed in the rear wall of the body by slitting the metal on either side thereof, the tongues being bent forward to a suitable angle, so as to properly actuate their respective lockers.

The locker $l$ should be constructed of resilient material, such as spring-steel, and may be punched from sheets of that material. The locker is fitted to slide upon the filler-body, being of a width slightly less than that of the space $b^3$ in the body, and its ends are turned forward at right angles, so as to form the latches $l'$ $l^2$, which extend over the outer rims of the terminal cartridges $c'$ $c^2$, the distance between these latches being substantially equal to the aggregate width of the file of cartridges for which the filler is adapted. The locker is provided with the inclined abutments $l^3$ $l^4$, which are preferably integral therewith, being formed by slitting the metal of the locker and bending the arms thus formed to the proper angle to engage with the locker-actuators $b^5$ $b^6$ of the clip-body. For convenience in constructing and assembling these fillers the locker-actuators $b^5$ $b^6$ may be bent forward substantially at right angles to the rear wall of the clip-body, as shown in Fig. 7, so as to enable the abutments $l^3$ $l^4$ of the locker to pass to the rearward sides of the actuators in the assembling operations, after which these actuators may be bent to a suitable angle for actuating the locker, as shown in Figs. 4 and 5.

The locker $l$ is preferably secured to the back plate $b^4$ of the filler-body by means of the rivet $r$, which is passed through the slot $b^7$ in the back plate and is riveted in place in the hole $l^5$ of the locker. The slot $b^7$ is elongated to a sufficient extent to permit of the necessary longitudinal movement of the locker with relation to the filler-body, the parts being fitted together with sufficient looseness to allow of that longitudinal movement.

In the operation of filling this filler with cartridges the locker is pushed in either direction to its full extent longitudinally of the filler-body, retracting the leading latch of the locker and thus opening that end of the filler toward which it is pushed, so as to enable the cartridges to be inserted at that opened end. The opposite end of the filler remains closed by its corresponding end of the locker, so that the cartridges cannot drop out at one end as they are inserted at the other. As the last cartridge is inserted the entire file is pushed forward, the opposite terminal cartridge engaging with its adjacent latch and moving the locker to its central position, (shown in Fig. 4,) in which position it allows the previously-retracted latch to close behind the cartridge last inserted. Thus the latches serve to lock both ends of the filler by hooking over each of the terminal cartridges.

In placing one of these improved fillers, with its file of cartridges, upon the firearm for the purpose of transferring those cartridges into the magazine thereof no attention need be paid to bringing a particular end of the filler uppermost. It is placed, as represented in Fig. 9, after retracting the breech-bolt B to its fullest extent, so as to open the way to the magazine. As soon as the filler is thus placed in position upon the lug 3 of the firearm the cartridges are immediately pressed downwardly into the magazine by the thumb of the operator, placed upon the top of the uppermost cartridge. The downward pressure thus applied operates to push the locker to its lowest position, carrying the abutment $l^4$ up the face of the locker-actuator $b^6$, as shown in Figs. 5 and 9, thereby retracting the lower latch $l^2$ thereof and enabling the cartridges to be pushed freely past that latch to their proper position in the magazine. At the completion of this filling operation no further attention need be paid to the emptied filler. The breech-bolt is pushed forward in the usual manner, carrying with it the uppermost cartridge out of the magazine into the chamber of the gun, this forward movement of the bolt serving also to detach and eject the filler, first swinging it upon its lug 3 as upon a hinge, so as to carry its lower end out of the breech-opening from the position shown in Fig. 9 through that shown in Fig. 10 to that shown in Fig. 12, in which latter position it is detached from the lug 3 and is fully ejected from the firearm.

The modification of my invention shown in Figs. 13 to 17, inclusive, differs from that shown in the previous figures chiefly in the form and disposition of the cartridge-locker, the filler-body being substantially like that already described. In this modification the locker L rests in the longitudinal space behind the rearward faces of the cartridges' heads only throughout the central portion of the filler-body. The ends of the lockers are, however, bent backwardly, so as to pass outwardly at an angle through the rearward wall or back plate of the filler-body, against the rearward side of which they normally lie in contact, as shown in Fig. 16, when in their locking position. The angular bends in the locker form inclined abutments $L^3$ $L^4$, which are located in proper relation to the locker-actuating edges $B^5$ $B^6$ of the filler-body $b$. The extremities of the locker are bent forward substantially at right angles to the remainder thereof to form the latches $L'$ $L^2$, which extend forwardly over the cartridge-receiving channels $B'$ $B^2$, so as to engage with the upper and lower edges, respectively, of the terminal cartridges $C'$ $C^2$, as shown in Fig. 14. The distance between these latches is also substantially equal to or slightly greater than the aggregate width of the cartridges in the file, and the length of the filler-body B is less than the distance between the latches, so as to allow the locker to move longitudinally with relation to the body to an extent sufficient to unlock the latches, the ends of the filler-body serving as stops for the locker at each end of its movement. In order to unlock either end of the filler, it is necessary, as in the form previously described, to push the locker longitudinally toward that end of the filler which it is desired to unlock, as shown in Fig. 17. This movement of the locker relative to the filler-body brings the abutment $L^4$ into operative engagement with the actuator $B^6$ of the filler-body. It thus retracts the leading end of the locker in whichever direction it may be pushed.

It will be observed that no rivet corresponding to the rivet $r$ of the preceding figures is used in connection with the modified form shown in Figs. 13 to 17, inclusive, for the reason that no rivet is therein required, although it may be used if deemed preferable. The ends of the locker are fitted to slide freely through the slots in the back plate $B^4$ of the filler-body $b$, yet not so loosely as to allow of an undue amount of lateral movement relative thereto, while the manner in which the locker is interlaced with the back plate prevents the two parts from separating in the ordinary use of the filler. In assembling the two parts of this filler one end of the locker is pushed through its slot in the back plate of the filler-body far enough to enable its opposite end to be sprung backward through the corresponding slot in the opposite end of that back plate, from which position it may readily be pushed to place.

Both of the forms of the locker shown in the drawings should be made of material having a considerable degree of resiliency, although the body portions may be made of material having a lesser degree of resilience—such, for example, as mild steel of a suitable temper to enable it to be bent and flattened to the form shown.

In a contemporaneously-pending application of E. G. Parkhurst, Serial No. 624,538, filed February 23, 1897, is shown, described, and claimed a cartridge-containing-magazine filler provided with one or more clips or clasps for hooking over a supporting-lug adjacent to the magazine, so as to hold the filler against accidental displacement during the operation of charging the magazine, sustaining the weight of the overhanging cartridges and the pressure applied thereto against their tendency to pull the filler forward into the breech-opening. This feature of the invention being thus shown and claimed in that application, I do not broadly claim it herein.

By reference to Fig. 4 it will be observed that the clearance-openings $l^6$ $l^7$ in the locker $l$ behind the actuators $b^5$ $b^6$, respectively, are long enough to allow of the longitudinal movement of the locker required to retract either latch, as shown in Fig. 5, without laterally moving the other. A similar provision is made in the modification shown in Figs. 13 to 17, whereby the upper latch L' follows the downward longitudinal movement of the locker and its cartridges in retracting the lower or leading latch L² without altering the lateral position of the upper or following latch L'.

It is not an essential feature of this invention that the latches thereof shall be constructed in an integral piece, since they may, if desired, be disconnected and operate independently of each other; but I prefer to combine them in an integral piece, herein designated as the "locker," for the reasons that the filler may thus be made in fewer parts of simpler construction, which are more easily secured together, and for the further reason that as it is never required to retract both latches at the same time there is no objection to allowing the latch which is not to be retracted to follow the longitudinal movement required for retracting the opposite or leading latch.

From the foregoing it will be obvious that the reversible construction of the filler herein shown is not an essential although a highly-desirable feature of this invention, inasmuch as it would be completely operative with respect to either end of the filler even if the opposite end of the cartridge-channel were to be permanently closed and the retractible latch thereof were to be cut off from the locker or omitted therefrom. Such a single-ended filler, while it might be preferable, and perhaps even necessary, for use in connection with certain types of firearms, would, at least when employed in connection with a firearm of the type herein shown, be objectionable for the reason that it must be attached to the firearm with its open end toward the magazine, and this requirement would lead to hesitation, confusion, and frequent mistakes at critical junctures. For these reasons I consider the reversible form to be altogether preferable where the type of firearm used permits of its employment and have therefore shown and described the invention as constructed and applied in what I believe to be its most useful and valuable form.

I claim as my invention—

1. In combination with a magazine-filler, a locker mounted to slide thereon, and means coacting between the filler and the locker which retract the latter upon its said movement.

2. A magazine-filler consisting of a body portion for receiving a file of cartridges, provided with a longitudinally-movable latch located at the end of the filler-body and normally projecting into the pathway of the file of cartridges, with means coacting between the filler and the latch which retract the latter when it is moved longitudinally by the cartridges.

3. A magazine-filler consisting of a body portion and of a locker supported thereon for longitudinal movement relatively thereto, the filler-body being provided with a longitudinal cartridge-head-receiving channel, and the locker being provided with latches which normally extend over the opposite ends of the cartridge-channel, the filler-body being provided with a locker-actuator at each of its ends for engaging with and retracting the leading latch as the locker is moved longitudinally.

4. A magazine-filler consisting of a body portion provided with a longitudinal cartridge-receiving channel, and of a locker supported for longitudinal movement upon the filler-body, provided with latches which normally project over the opposite ends of the channel, the locker being provided with inclined abutments adjacent to its ends for engaging with locker-actuating members upon the filler-body, whereby the longitudinal movement of the locker relative to the filler-body operates to retract the leading latch laterally out of the plane of the cartridge-channel, substantially as described.

5. In a magazine-filler, the combination of a body portion provided with a longitudinal channel for receiving the heads of a file of superimposed cartridges, and with a longitudinal channel or space $b^3$ between the cartridge-channel and the back plate, a locker located in the space $b^3$, and having its ends bent forward so as to form locking-latches which normally project over the opposite ends of the cartridge-channel, the filler-body being provided with a locker-actuator at each end for engaging with the corresponding ends of the locker, whereby the longitudinal movement of the locker relative to the filler-body operates to retract the leading latch, substantially as described.

6. A magazine-filler, consisting of a body portion having a cartridge-head-receiving channel, and having a clasp for engaging with the receiver of the firearm, a cartridge-locker supported upon the filler-body and movable longitudinally thereof, having locking-faces at its opposite ends, which normally project forward and over the opposite ends of the cartridge-head-engaging channel.

7. A magazine-filler, consisting of a body portion having a cartridge-head-receiving channel formed by the flanged edges thereof, and provided with a clasp for attaching the filler to the firearm, a cartridge-locker longitudinally movable thereon therefor, having locking-faces at its opposite ends which normally project forwardly over the opposite ends of the cartridge-channel, with means for retracting the leading end of the cartridge-locker as it is pushed longitudinally with relation to the filler-body, substantially as described.

8. A cartridge-containing-magazine filler, consisting of a body portion having a cartridge-receiving channel, and of two latches combined in an integral double-ended locker, mounted for longitudinal movement upon the body portion with its latches normally extending over the opposite ends of the cartridge-receiving channels thereof, each end of the filler being provided with means substantially as described for retracting its adjacent latch when the locker is moved toward that end, clearance being provided behind the latch-retracting means, whereby the locker may be moved toward either end without retracting the latch upon the opposite end, substantially as described and for the purpose specified.

W. H. HONISS.

Witnesses:
 JENNIE NELLIS,
 F. A. CLEMONS.